UNITED STATES PATENT OFFICE.

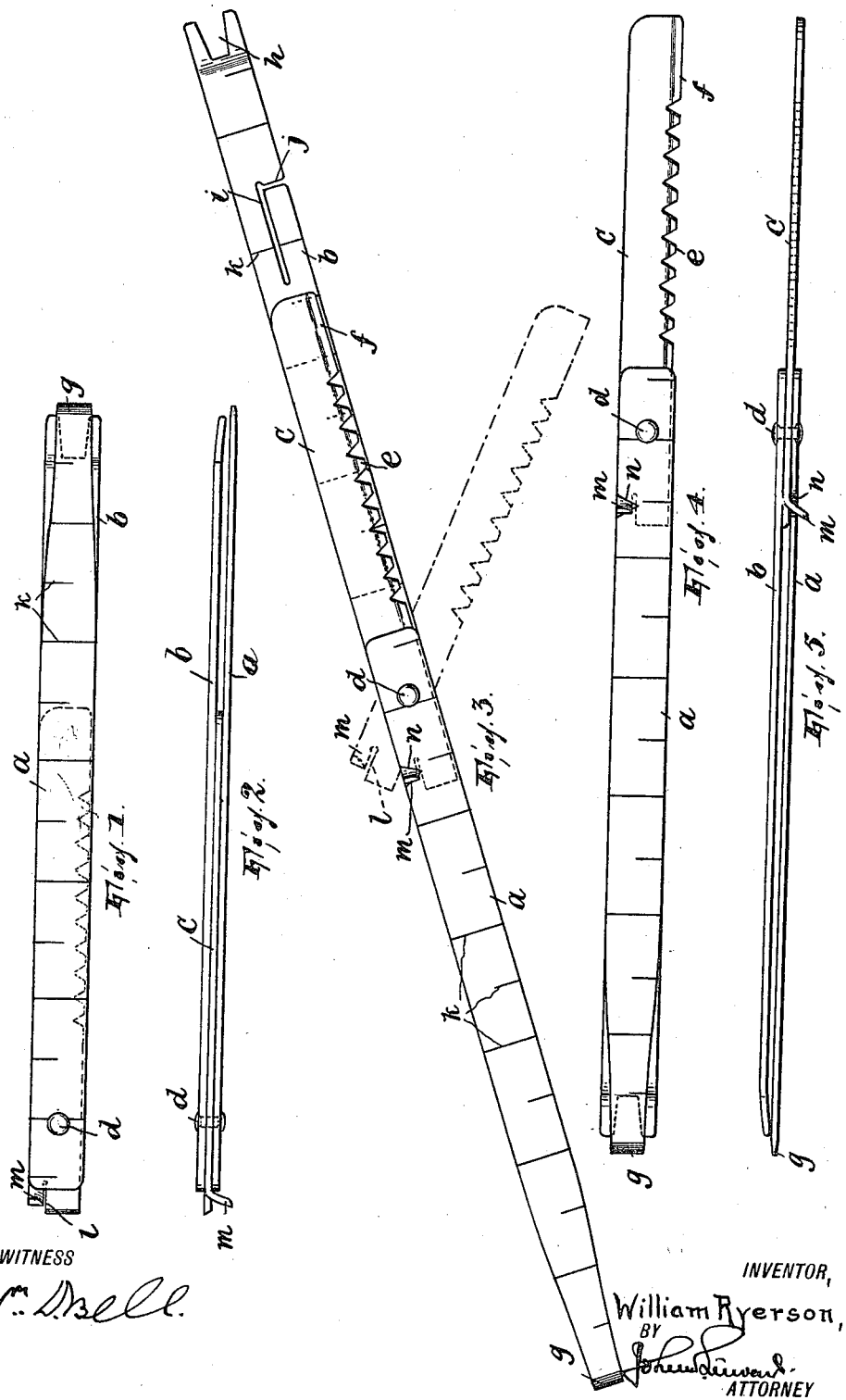

WILLIAM RYERSON, OF PATERSON, NEW JERSEY, ASSIGNOR OF ONE-HALF TO CHARLES SERRIERE, OF HAWTHORNE, NEW JERSEY.

ANGLER'S TOOL.

1,322,826.      Specification of Letters Patent.      Patented Nov. 25, 1919.

Application filed May 16, 1919. Serial No. 297,551.

*To all whom it may concern:*

Be it known that I, WILLIAM RYERSON, a citizen of the United States, residing at Paterson, in the county of Passaic and State of New Jersey, have invented certain new and useful Improvements in Anglers' Tools, of which the following is a specification.

This invention relates to combination tools, and it has for its especial object to provide a combination tool for use by anglers in scaling and cleaning fish, measuring the length thereof, releasing the hook from the fish, and making repairs in the pole, reel, and other angling paraphernalia, although it will be understood that in certain respects of the invention it is not necessarily limited to these uses.

In the drawing,

Figure 1 shows the implement in plan, folded;

Fig. 2 shows it in side elevation, also folded;

Fig. 3 shows the implement in plan in one of its extended positions;

Fig. 4 shows the implement in plan in another of its extended positions; and

Fig. 5 shows the implement in side elevation extended as it appears in Fig. 4.

$a$, $b$, $c$ designate three metal strips arranged face to face as shown in Figs. 1 and 2, the strips $a$, $b$ being approximately of the same length and the strip $c$ somewhat shorter. Strips or members $a$, $b$ are adapted to form a handle in certain uses of the implement, and strip or member $c$ a tool. The three members are penetrated near one end by a rivet $d$, which forms a pivot therefor.

In the present instance member $c$ is shown as formed with an edge which is serrated at $e$ so as to be useful in removing the scales from a fish and sharpened at $f$ so as to be useful as a knife for opening the fish.

The members $a$, $b$ are preferably formed so that each may serve as some useful tool. For instance the member $a$ has its free end $g$ formed like that of a screw-driver. The member $b$ has its free end forked, as at $h$, and near said free end it has an opening $i$ (best in the form of a longitudinal slot) to which there leads laterally an inlet passage $j$; this part of the implement is useful in disgorging a hook which has been swallowed by the fish, the line being first entered into the fork $h$ and then, by the inlet, into the opening $i$, whereupon using the line as a guide the forked end is thrust down the throat of the fish till the fork receives and abuts the crook of the fish-hook, which by means of the implement may then be pried loose and withdrawn. Again, both members $a$ and $b$ may have scale markings $k$ thereon so that when the implement is extended they may be employed for measuring the length of a fish and the like.

The rivet $d$ clamps the members fairly tightly together so that when folded (Figs. 1 and 2) they will tend to retain that position, and when member $c$ is extended and members $a$, $b$ remain face to face they will also tend to retain that position, thus on the one hand to insure members $a$, $b$ properly serving their function as a sheath for member $c$ and on the other to insure their serving to best advantage as a handle for member $c$. The movement of members $a$ and $b$ one relatively to the other not only permits their uncovering each other so that either may be used for the function for which it is specifically intended, but the uncovering of member $c$ so as to permit it to be conveniently shifted from the folded to the extended position.

When the member $c$ is extended it should preferably have its pivoted movement limited by one of the members $a$, $b$. To this end its pivoted end is split, as at $l$, and the portion $m$ at one side of the split bent off obliquely so as to overlie the plane of one of the members $a$, $b$, as $a$. Preferably member $a$ has a notch $n$ to receive this stop $m$, the sides of the notch being inclined so that when the stop is forced into the notch it will be cramped and by friction resist any tendency of member $c$ toward folding movement.

Having thus fully described my invention, what I claim as new and desire to secure by Letters Patent is:—

In combination, a strip-like tool member and a strip-like handle member arranged face to face and pivoted together near one end thereof, the tool member being movable on the pivot into extended relation to the handle member, one member having a bent-off portion to engage the other member and limit the pivotal movement thereof, and said other member having an edge affording a binding contact to said portion and extending obliquely across the circular path in which said bent-off portion moves when out of contact with said other member.

In testimony whereof I affix my signature.

WILLIAM RYERSON.